United States Patent [19]
Andrey

[11] Patent Number: 5,723,931
[45] Date of Patent: Mar. 3, 1998

[54] MULTIPLE POLE, MULTIPLE PHASE, PERMANENT MAGNET MOTOR AND METHOD FOR WINDING

[75] Inventor: Boris Daniel Andrey, Wheeling, Ill.

[73] Assignee: MPC Products Corporation, Niles, Ill.

[21] Appl. No.: 583,729

[22] Filed: Jan. 17, 1996

[51] Int. Cl.⁶ .............................. H02K 3/00; H02K 3/28
[52] U.S. Cl. .................... 310/179; 310/208; 310/184; 310/198; 242/433
[58] Field of Search .............................. 310/208, 179, 310/156, 254, 204, 205, 206, 184, 198; 242/433

[56] References Cited

U.S. PATENT DOCUMENTS

| | | |
|---|---|---|
| Re. 31,950 | 7/1985 | Binns . |
| 508,658 | 11/1893 | Thomson . |
| 1,123,161 | 12/1914 | Andrews . |
| 3,600,619 | 8/1971 | Tiarks . |
| 3,860,843 | 1/1975 | Kawasaki et al. ............ 310/67 |
| 4,005,347 | 1/1977 | Erdman . |
| 4,260,923 | 4/1981 | Rawcliffe . |
| 4,492,890 | 1/1985 | MacDonald . |
| 4,642,537 | 2/1987 | Young . |
| 4,654,566 | 3/1987 | Erdman . |
| 4,677,743 | 7/1987 | Logie ................................ 29/596 |
| 4,692,645 | 9/1987 | Gotou ............................... 310/184 |
| 4,814,677 | 3/1989 | Plunkett . |
| 4,847,982 | 7/1989 | Morrill ............................. 29/596 |
| 5,170,083 | 12/1992 | Burgbacher . |
| 5,233,253 | 8/1993 | Nishio et al. . |
| 5,268,609 | 12/1993 | Sakashita et al. ............... 310/179 |
| 5,486,731 | 1/1996 | Masaki et al. ................... 310/180 |

*Primary Examiner*—Steven L. Stephan
*Assistant Examiner*—B. Mullin
*Attorney, Agent, or Firm*—Laff, Whitesel, Conte & Saret, Ltd.

[57] ABSTRACT

A multiple pole, multiple phase, permanent magnet motor comprising a rotor having a plurality of permanent magnet poles, a stator having a plurality of stator slots and an equal number of stator teeth defined by adjacent stator slots, and a plurality of phase windings disposed on the stator, each phase winding including a plurality of coils having a non-uniform number of turns, such that electromagnetic poles are developed in proximity to the stator, the electromagnetic poles for each phase being distributed symmetrically about the stator, equidistant from one another, and equal in number to the number of permanent magnet rotor poles. The number of turns of each of the plurality of coils of each phase winding is selected in accordance with a predetermined sinusoidal relation.

16 Claims, 9 Drawing Sheets

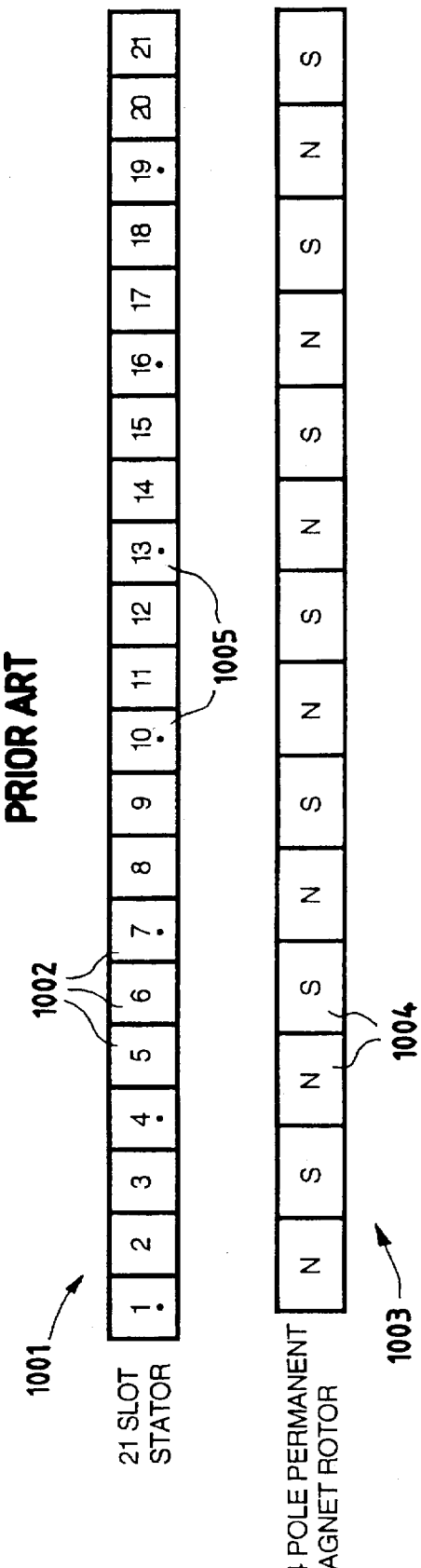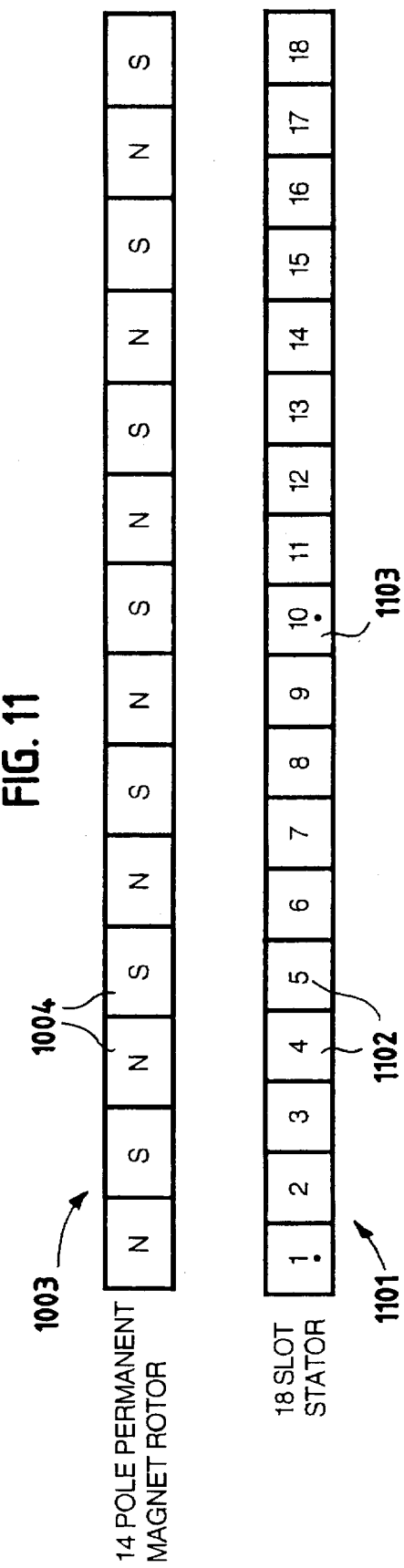

FIG. 12

| TOOTH | MECHANICAL ANGLE | PHASE 1 ELECTRICAL ANGLE | PHASE 1 Sin ANGLE | PHASE 1 PERCENT TURNS | PHASE 2 (ADD 120 DEG.) ELECTRICAL ANGLE | PHASE 2 Sin ANGLE | PHASE 2 PERCENT TURNS | PHASE 3 (ADD 240 DEG.) ELECTRICAL ANGLE | PHASE 3 Sin ANGLE | PHASE 3 PERCENT TURNS |
|---|---|---|---|---|---|---|---|---|---|---|
| 1 | 0 | 60 | 0.866 | 7.63% | 180 | 0.000 | 0.00% | 300 | -0.866 | 7.63% |
| 2 | 20 | 200 | -0.342 | 3.02% | 320 | -0.643 | 5.67% | 440 | 0.985 | 8.68% |
| 3 | 40 | 340 | -0.342 | 3.02% | 460 | 0.985 | 8.68% | 580 | -0.643 | 5.67% |
| 4 | 60 | 480 | 0.866 | 7.63% | 600 | -0.868 | 7.63% | 720 | 0.000 | 0.00% |
| 5 | 80 | 620 | -0.985 | 8.68% | 740 | 0.342 | 3.02% | 860 | 0.643 | 5.67% |
| 6 | 100 | 760 | 0.643 | 5.67% | 880 | 0.342 | 3.02% | 1000 | -0.985 | 8.68% |
| 7 | 120 | 900 | 0.000 | 0.00% | 1020 | -0.866 | 7.63% | 1140 | 0.866 | 7.63% |
| 8 | 140 | 1040 | -0.643 | 5.67% | 1160 | 0.985 | 8.68% | 1280 | -0.342 | 3.02% |
| 9 | 160 | 1180 | 0.985 | 8.68% | 1300 | -0.643 | 5.67% | 1420 | -0.342 | 3.02% |
| 10 | 180 | 1320 | -0.866 | 7.63% | 1440 | 0.000 | 0.00% | 1560 | 0.866 | 7.63% |
| 11 | 200 | 1460 | 0.342 | 3.02% | 1580 | 0.643 | 5.67% | 1700 | -0.985 | 8.68% |
| 12 | 220 | 1600 | 0.342 | 3.02% | 1720 | -0.985 | 8.68% | 1840 | 0.643 | 5.67% |
| 13 | 240 | 1740 | -0.866 | 7.63% | 1880 | 0.866 | 7.63% | 1980 | 0.000 | 0.00% |
| 14 | 260 | 1880 | 0.985 | 8.68% | 2000 | -0.342 | 3.02% | 2120 | -0.643 | 5.67% |
| 15 | 280 | 2020 | -0.643 | 5.67% | 2140 | -0.342 | 3.02% | 2260 | 0.985 | 8.68% |
| 16 | 300 | 2160 | 0.000 | 0.00% | 2280 | 0.866 | 7.63% | 2400 | -0.866 | 7.63% |
| 17 | 320 | 2300 | 0.643 | 5.67% | 2420 | -0.985 | 8.68% | 2540 | 0.342 | 3.02% |
| 18 | 340 | 2440 | -0.985 | 8.68% | 2560 | 0.643 | 5.67% | 2660 | 0.342 | 3.02% |
| | | | ABSOLUTE TOTAL 11.343 | TOTAL PERCENT 100% | | ABSOLUTE TOTAL 11.343 | TOTAL PERCENT 100% | | ABSOLUTE TOTAL 11.343 | TOTAL PERCENT 100% |

MULTIPLE POLE, MULTIPLE PHASE, PERMANENT MAGNET MOTOR AND METHOD FOR WINDING

FIELD OF THE INVENTION

This invention relates generally to permanent magnet motors and in particular to multi-pole, multi-phase permanent magnet motors, and is more particularly directed toward a winding distribution technique that permits the use of stator slot and pole combinations that reduce or eliminate slot effect, detent and ratcheting, resulting in smooth, efficient, low-speed performance.

BACKGROUND OF THE INVENTION

Brushless DC (direct current) motors are utilized in many applications requiring smooth low-speed operation. Among these are electrically-driven positioning or pointing devices, robots for assembly lines, azimuth and elevation gimbals, solar array drives, electric vehicles, guidance systems, and wheel chair drives.

Of course, DC motors in general enjoy the advantage over AC (alternating current) motors that it is comparatively easy to vary the operational speed and direction of rotation. Brush commutated motors, however, suffer from the disadvantages of brush wear and sparking at the brush/commutator segment interface. This sparking often results in the generation of electrical noise that can limit the applications in which these mechanically-commutated motors can be employed.

In an electronically commutated motor (ECM), there are multiple field windings that are energized by drive circuitry in a selected sequence to establish a rotating magnetic field. A permanent magnet rotor interacts with the rotating magnetic flux of the field windings to produce motor rotation in a fashion well-known in the art. Position sensors are generally required to provide instantaneous rotor position information to the drive circuitry in order that the ECM will both start and rotate in its designed fashion. These position sensors often take the form of resolvers, optical encoders, or Hall effect devices.

In brushless DC motors of the prior art, stators are wound with concentric coil lay-ins requiring various coil pitches to form the electromagnetic poles necessary for rotation. The stator slot count is constrained such that the poles and phases will occur at the proper electrical and mechanical spacing.

One shortcoming of this arrangement is that the number of stator teeth that can be exactly aligned with permanent magnet rotor poles at any given time is at least equal to the number of magnets. The result is high slot effect or ratcheting at low motor speeds. Skewing the rotor or stator (or both) reduces this effect, but this is at the expense of motor performance and efficiency.

Accordingly, a need arises for a winding technique that reduces or eliminates slot effect or ratcheting, without recourse to the expedient of skewing the stator or rotor.

SUMMARY OF THE INVENTION

These needs and others are satisfied by the multiple pole, multiple phase, permanent magnet motor of the present invention, comprising a rotor having a plurality of permanent magnet poles, a stator having a plurality of stator slots and an equal number of stator teeth defined by adjacent stator slots, and a plurality of phase windings disposed on the stator, each phase winding including a plurality of coils having a non-uniform number of turns, to develop electromagnetic poles in proximity to the stator, the electromagnetic poles for each phase being distributed symmetrically about the stator, equidistant from one another, and equal in number to the number of permanent magnet rotor poles. The number of turns of each of the plurality of coils of each phase winding is selected in accordance with a predetermined sinusoidal relation. The sinusoidal relation has a period determined by one-half the ratio of the number of stator teeth to the number of permanent magnet poles.

In one form, the predetermined sinusoidal relation comprises:

$$n(t) = A \sin(\omega t - \theta);$$

where
  n=number of turns;
  t=tooth number;
  $\omega = (p/T)\pi$;
where
  p=number of poles;
  T=total number of stator teeth;

$$\theta = \phi/2 + \alpha$$

where
  $\phi$=electrical angle between phases;
  $\alpha$=mechanical angle between teeth; and
  A=a constant of proportionality.

The constant of proportionality A is determined by dividing the total number of turns per phase by the sum of the absolute values of $$\sin(\omega t - \theta)$$

from t=1 to t=T. Winding direction is selected in accordance with the sign of n(t), and each of the coils of each phase winding surrounds no more than one stator tooth. The number of stator slots is an integral multiple of the number of phases, while the number of stator slots is greater than the number of permanent magnet poles.

In one aspect of the invention, each phase winding is mechanically and electrically displaced from adjacent phase windings by an amount equal to 360 degrees divided by the number of phases. The motor is an electronically commutated motor, including position sensors coupled to a multiple phase drive network. The position sensors may be Hall effect sensors. The motor may be a three-phase motor, with phase windings connected in a Y configuration.

In another form of the invention, for a multiple pole, multiple phase, permanent magnet motor having a rotor including a plurality of permanent magnet poles, a stator including a plurality of stator slots and an equal number of stator teeth defined by adjacent stator slots, and a plurality of phase windings including a plurality of coils, a method is provided for determining number of turns and winding direction for each of the plurality of coils. The method comprises the steps of selecting a first stator tooth, assigning a mechanical angle of 0 degrees to the first stator tooth, determining the mechanical angles of each subsequent tooth by adding an increment equal to 360 degrees divided by the number of stator teeth to the mechanical angle of the preceding tooth, and assigning an electrical angle of one-half the electrical angle between phases to the first stator tooth. The electrical angles of each subsequent tooth are determined by multiplying the mechanical angle of the tooth by one-half the number of permanent magnet poles and adding an offset equal to one-half the electrical angle between phases. Subsequent steps include determining the sine of each of the tooth electrical angles, determining the number of turns for each tooth by dividing the sine of the tooth electrical angle by the sum of the absolute values of the sines of all of the tooth electrical angles, then multiplying by the total number of turns per phase, and applying the number of turns determined to the corresponding tooth in a first direction if the sine of the electrical angle has a first sign, else in the opposite direction.

If the sine of the electrical angle for a given tooth is zero, no turns are wound on that tooth, and the next tooth is wound with the appropriate number of turns. Each of the coils of each phase winding surrounds no more than one stator tooth. The number of turns and the winding direction for the coils of each subsequent phase winding are determined by adding the electrical angle between phases to each electrical angle and computing the sine values.

Further objects, features, and advantages of the present invention will become apparent from the following description and drawings.

BRIEF DESCRIPTION OF THE DRAWINGS

FIG. 10 depicts a stator and rotor showing the degree of alignment that can occur between stator teeth and permanent magnet poles;

FIG. 11 also depicts prospective stator tooth and permanent magnet pole alignment;

FIG. 12 shows a table of sine values for a 14-pole, 3-phase motor having an 18 tooth stator;

DETAILED DESCRIPTION OF THE INVENTION

In accordance with the present invention, a multiple pole, multiple phase permanent magnet motor and winding method are described that provide distinct advantages when compared to those of the prior art. The invention can best be understood with reference to the accompanying drawing figures.

Figure 1:
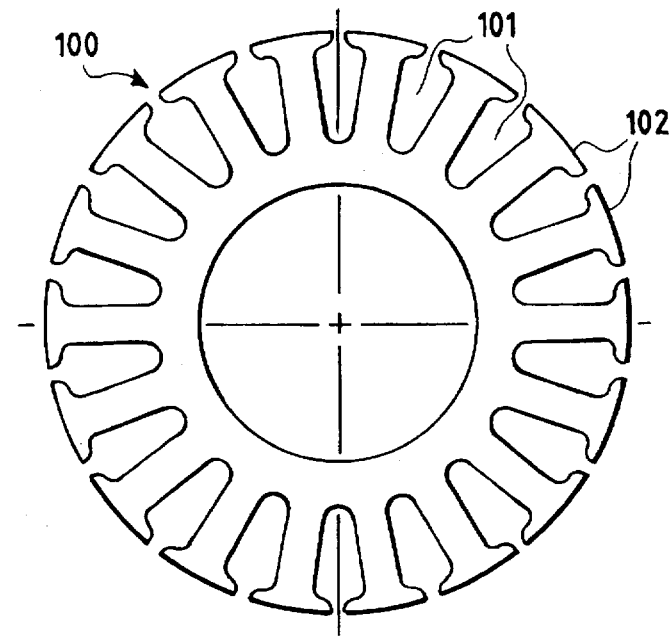
FIG. 1 is a top view of a stator of conventional design.
Figure 2:
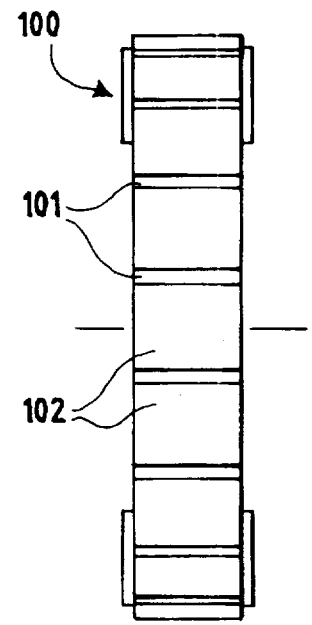
FIG. 2 is a side view of the stator of FIG. 1.

FIGS. 1 and 2 illustrate a stator 100 of conventional construction. In general, the stator 100 is formed from laminations of ferromagnetic material in a known manner. The stator includes a plurality of stator slots 101 and an equal number of stator teeth 102 defined by adjacent slots 101.

Figure 3:
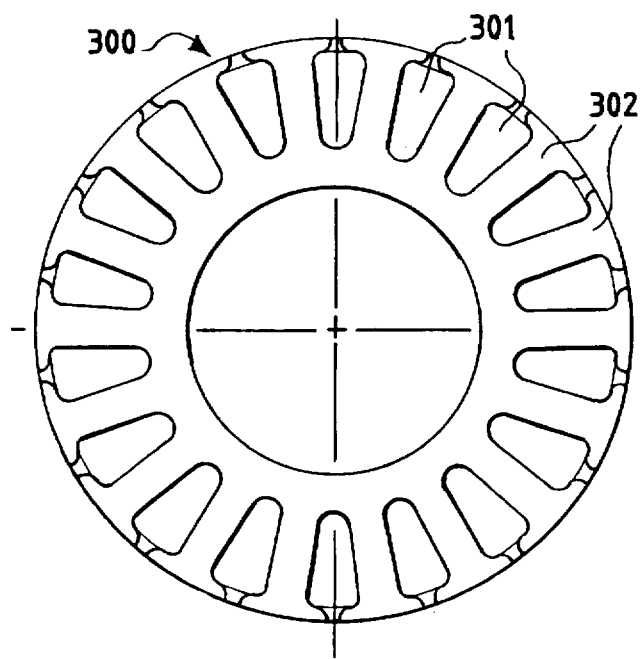
FIG. 3 is a top view of a skewed stator.
Figure 4:
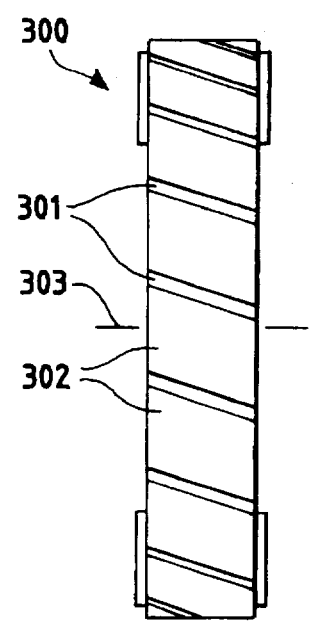
FIG. 4 is a side view of the stator of FIG. 3.

FIGS. 3 and 4 depict a stator 300 that has been skewed in an effort to minimize slot effect. The stator 300 also has a plurality of slots 301 and an equal number of teeth 302 defined by adjacent slots 301, but the slots 301 are skewed so as to form an angle with respect to the longitudinal axis 303 of the stator 300, as is more readily apparent from the side view of FIG. 4. This skewing of the stator slots 301 minimizes the total area of stator teeth 302 that can be instantaneously aligned with permanent magnet rotor poles, in a fashion that will become apparent subsequently.

Figure 5:
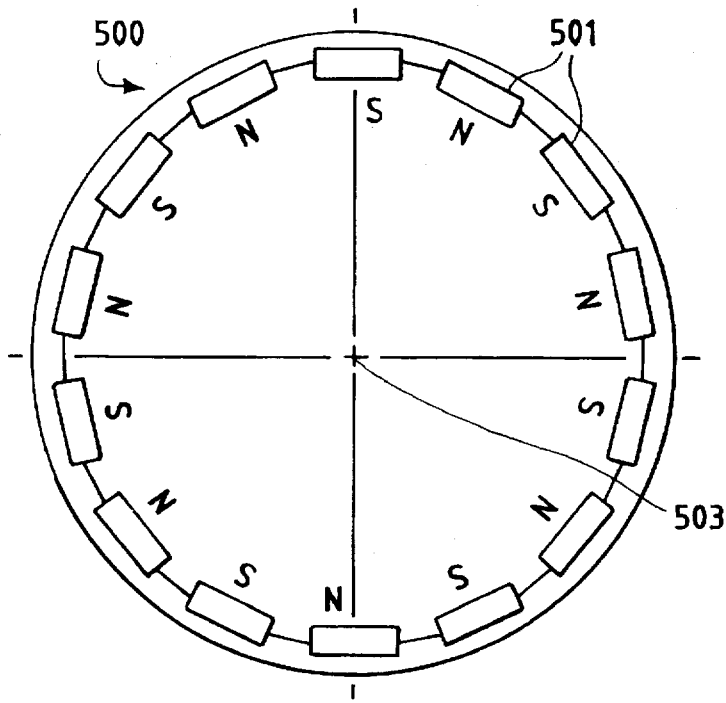
FIG. 5 is a top view of a rotor of conventional design.
Figure 6:
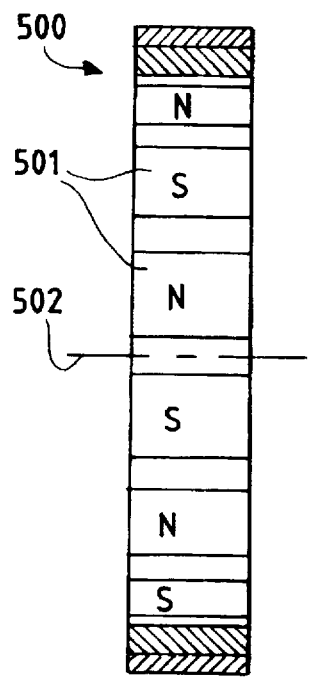
FIG. 6 is a side view of the rotor of FIG. 5.

FIGS. 5 and 6 show a rotor 500 having a plurality of permanent magnet poles 501 disposed about its periphery. The rotor 500 is rotatably mounted in proximity to its associated stator assembly via a rotor shaft (not shown) positioned at the center 503 of the rotor 500 and extending parallel to its longitudinal axis 502. The permanent magnet poles 501 are disposed such that north (N) and south (S) magnetic poles alternate around the rotor circumference.

Figure 7:
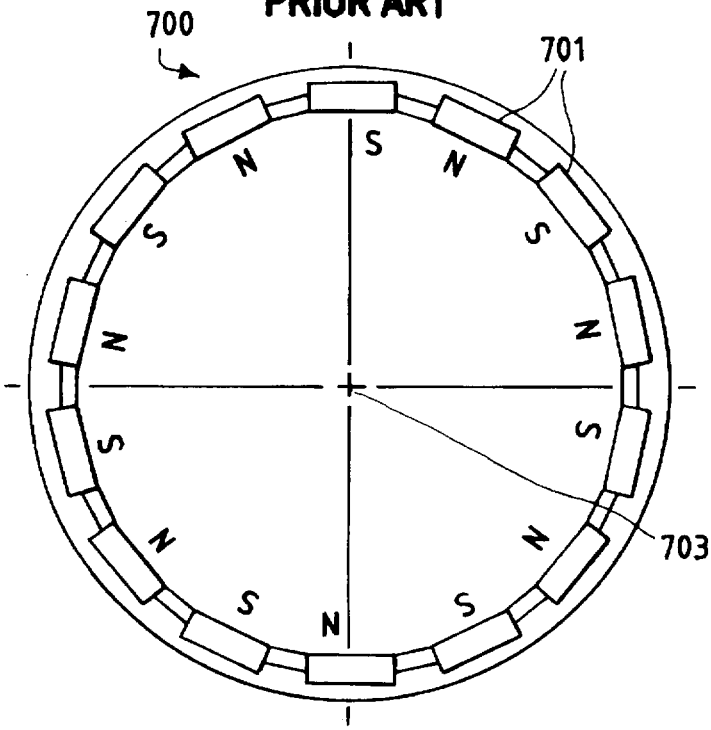
FIG. 7 is a top view of a skewed rotor.
Figure 8:
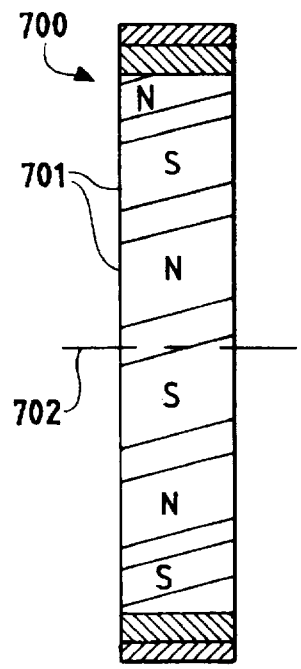
FIG. 8 is a side view of the rotor of FIG. 7.

FIGS. 7 and 8 illustrate a skewed rotor 700. Of course, the rotor 700 also has a plurality of permanent magnet poles 701 arranged about the rotor periphery, but the poles are skewed as is more apparent in the side view of FIG. 8, such that the poles 701 are disposed at an angle with respect to the longitudinal axis 702 of the rotor 700. This skewing of the poles disposed about the rotor 700 yields a skewed rotor 700 that exhibits a reduced slot effect when compared to the straight rotor depicted in FIGS. 5 and 6.

Figure 9:
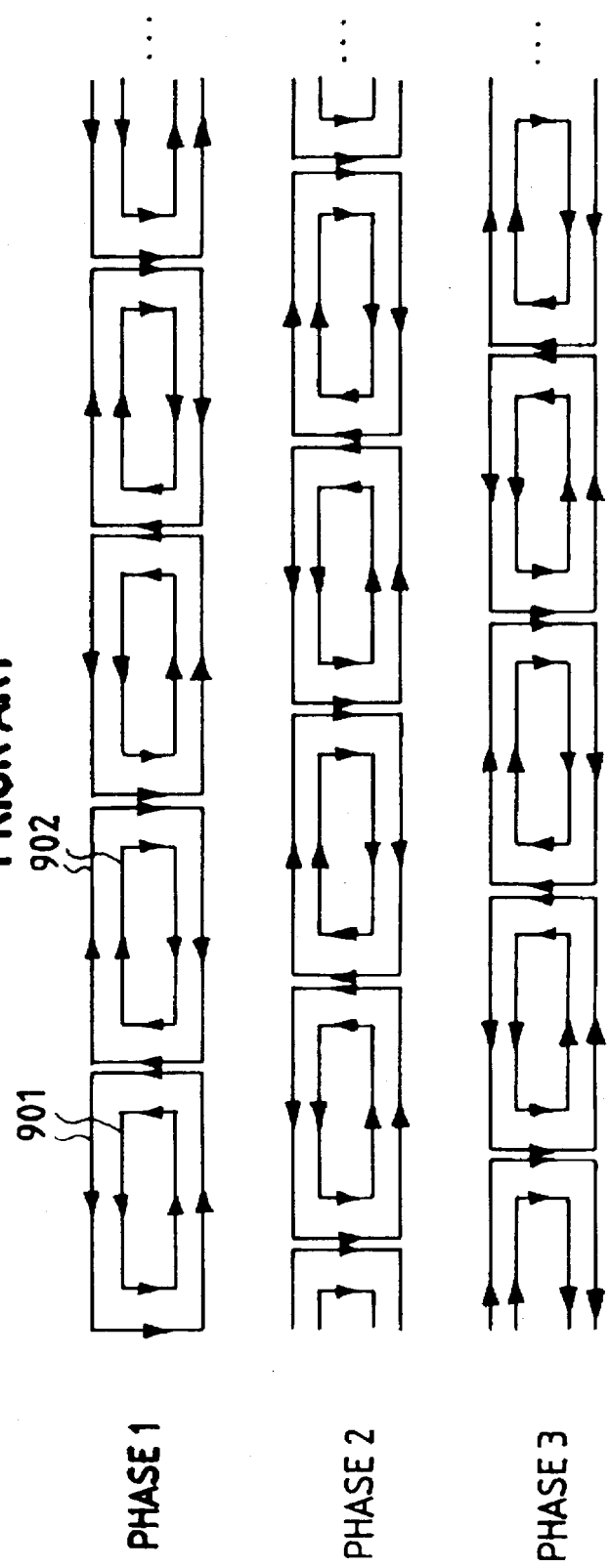
FIG. 9 is a partial depiction of a conventional multiple phase stator winding, using concentric coil winding lay-ins.

In FIG. 9, the cylindrical surface of the stator has been "unrolled" to form a flat surface in which the coils and their relationship to the individual stator slots can be more clearly apprehended. FIG. 9 is a partial depiction of perhaps the most conventional type of multiple phase stator winding, in which concentric coil winding lay-ins 901 with two coil pitches are employed. The coils in each pole have the same electromagnetic center.

In the technique of the prior art, the coils in each pole are wound in the same direction regardless of pitch or span. Each coil 901 is wound oppositely to the adjacent coil 902 in order to form a pole of the opposite polarity. The poles in each phase are equal to the number of motor poles, and each phase is mechanically displaced to reflect the desired electrical angle between phases.

A conventional 14-pole, 3-phase motor would require a 21 slot stator or a 42 slot stator. Ratcheting at low speed is a direct function of the number of stator teeth that simultaneously come into perfect alignment with permanent magnet rotor poles. The higher the percentage of stator teeth that satisfy this alignment criterion, the greater the detent torque becomes.

FIG. 10 depicts a stator 1001 and rotor 1003 whose cylindrical surfaces have been "unrolled" to form flat surfaces showing the degree of alignment that can occur between stator teeth and permanent magnet poles. The stator teeth 1002 have been consecutively numbered from 1 through 21. For each tooth that can achieve perfect alignment with a confronting permanent magnet pole 1004 of the rotor 1003, a dot has been added below the tooth number. Thus, it can be seen from the figure that teeth 1, 4, 7, 10, 13, 16, and 19 can be simultaneously aligned with permanent magnet rotor poles.

The worst case number of teeth that will align can be ascertained by finding the greatest common factor of the number of stator teeth and the number of rotor poles. For the situation depicted in FIG. 10, the number of stator teeth is 21=7×3. The number of rotor poles is 14=7×2. The greatest common factor is 7, and this does, in fact, correspond to the number of aligned teeth in FIG. 10.

Since the low-speed ratcheting effect can be reduced if the percentage of simultaneously aligned teeth can be reduced, a number of stator teeth should be selected that does not share a large common factor with the number of rotor poles. FIG. 11 shows an 18 slot stator 1101 matched with a 14 pole rotor 1003. Once again, the stator teeth 1102 have been consecutively numbered from 1 through 18, and a dot 1103 has been added below the tooth number wherever stator teeth and permanent magnet poles can be perfectly aligned. This only occurs for stator teeth 1 and 10, for a total of two teeth in perfect alignment.

The number of stator teeth for the stator 1101 of FIG. 11 is 18=2×3×3, while the number of rotor poles is 14=2×7. The greatest common factor is 2, which is consistent with the number of stator teeth shown in perfect alignment in the figure.

Although an 18 slot stator would seem like a good choice in terms of slot effect reduction, conventional wisdom dictates that an 18-slot stator cannot be used in a 14-pole, 3-phase motor using conventional winding techniques. With the winding technique of the present invention, however, an 18-slot stator is perfectly acceptable, as will now be explained.

In accordance with the present invention, a plurality of phase windings are disposed on the stator, with each phase winding including a plurality of coils having a non-uniform number of turns. Electromagnetic poles are developed in proximity to the stator, with the electromagnetic poles for each phase being distributed symmetrically about the stator, equidistant from one another, and equal in number to the number of permanent magnet rotor poles.

This is accomplished by selecting the number of turns of each of the plurality of coils of each phase winding in accordance with a predetermined sinusoidal relationship. For a 14-pole, 3-phase motor having an 18 slot stator, 14 electromagnetic poles must be symmetrically distributed over 18 stator slots. This means that 7 complete cycles of a sine wave must occur within the 18 slots, so the sinusoidal relation must have a period of 18/7. This can be generalized to a sinusoid having a period determined by one-half the ratio of the number of stator teeth to the number of permanent magnet poles.

Each winding surrounds no more than one stator tooth, and the winding direction is determined by the sign of the sinusoidal relation. In general, the sinusoidal relation is given by:

$$n(t) = A \sin(\omega t - \theta);$$

where
  n=number of turns;
  t=tooth number;
  $\omega = (p/T)\pi;$
where
  p=number of poles;
  T=total number of stator teeth;

$\theta = \phi/2 + \alpha;$ where $\phi$=electrical angle between phases;
  $\alpha$=mechanical angle between teeth; and
  A=a constant of proportionality.

The constant of proportionality A is selected to yield the proper number of turns for each coil. One way to do this is to treat each sine value as a weighted percentage of the total of all the sine values. In other words, A can be determined by dividing the total number of turns per phase by the sum of the absolute values of sin ($\omega t - \theta$) for t=1 to t=T.

FIG. 12 shows a table of sine values for a 14-pole, 3-phase motor having an 18 tooth stator. For each tooth, numbered 1 through 18, a mechanical angle is assigned starting with 0 degrees for tooth number 1 and incremented by 360 degrees divided by the number of teeth (360/18=20 degrees) for each subsequent tooth. For the coils of phase windings 2 and 3, the electrical phase angle is added to each of the electrical tooth angles determined for phase 1. The winding direction is determined by the sign of the sine function, and the number of turns is given as a percentage of the total for each phase (multiply by the total number of turns per phase to obtain the number of turns per tooth).

As will be noted from an inspection of FIG. 12, the sine values in Phase 1 for teeth 7 and 16 are zero. No coils are wound on teeth for which the sine of the electrical angle is zero. Winding simply resumes on the next tooth having a non-zero sine value.

Figure 13:
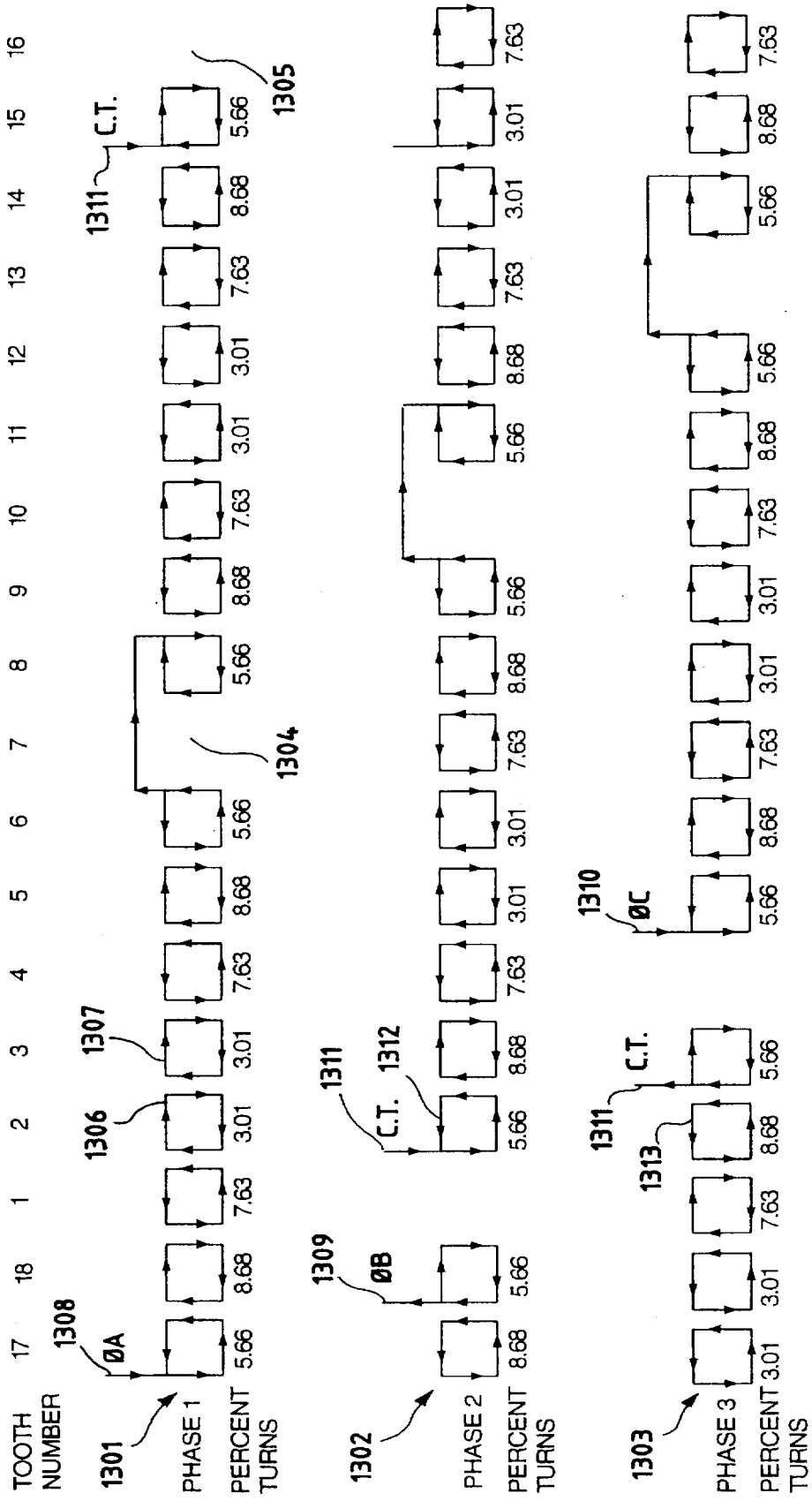
FIG. 13 depicts phase windings formed in accordance with the present invention.

FIG. 13 is another representation constructed by "unrolling" the cylindrical stator surface to form a flat surface that aids in visualization of the stator windings. Each phase winding 1301–1303 has been separated and placed one below the other for clarity's sake, even though, in practice, the corresponding coils for each phase are wound on the same stator teeth. For example, coil 1306 from Phase 1 is wound on stator tooth number 2, as is coil 1312 of Phase 2 and coil 1313 of Phase 3. The adjacent coils, such as 1306 and 1307, of each phase winding are connected together, although such connections are not shown in the figure for clarity.

As discussed above, some of the teeth have no coils for a particular phase winding. There is no coil for the Phase 1 winding on tooth number 7 (1304), for example, because the sine value for the electrical angle is zero. The same is true for tooth number 16 (1305) in Phase 1, and for two teeth in each phase, as will be noted from an inspection of the figure.

The phase windings 1301–1303 are depicted in a Y-configuration, since they are connected together at a common point 1311, labelled C.T. (center tap). Of course, the inventive winding technique will also work for other phase winding configurations, and the Y-configuration is depicted only as an exemplary phase winding connection. The connection points for the phase outputs of associated drive electronics are also shown in the figure as $\Phi$A (1308), $\Phi$B (1309), and $\Phi$C (1310). Drive circuitry will be treated briefly in subsequent paragraphs.

Figure 14:
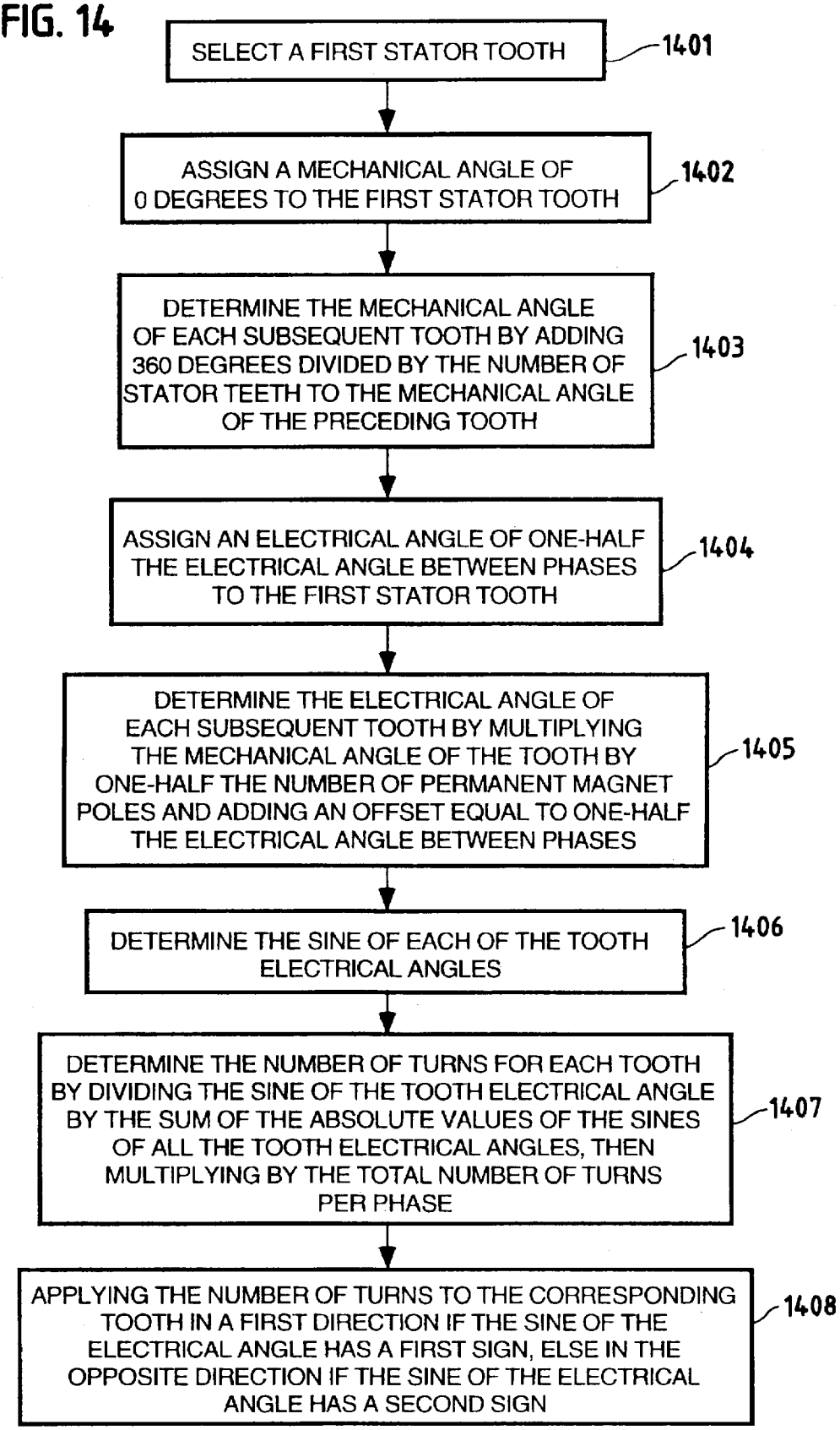
FIG. 14 is a flow chart of a method in accordance with the present invention.

FIG. 14 is a flow chart of a method in accordance with the invention for determining number of turns and winding direction of the coils in the phase windings of a multiple pole, multiple phase permanent magnet motor. In the first step 1401 of the process, a first stator tooth is arbitrarily selected.

In the next step 1402, a mechanical angle of 0 degrees is assigned to this first stator tooth, and in a subsequent operation 1403, the mechanical angle of each subsequent tooth is determined by adding 360 degrees divided by the total number of stator teeth to the preceding tooth. For a 14-pole, 3-phase motor having an 18 slot stator, the mechanical angle of the first tooth is arbitrarily zero, the mechanical angle of the next tooth is 360/18=20 degrees, the next tooth is 40 degrees, etc.

In the next operation 1404, an electrical angle of one-half the electrical angle between phases is assigned to the first stator tooth. For the 3-phase motor just described, the electrical angle of the first tooth is 60 degrees. The next step 1405 is to determine the electrical angle of each subsequent tooth. This is accomplished by multiplying the mechanical angle of the tooth by one-half the number of permanent magnet poles and adding an offset equal to one-half the electrical angle between phases. For the 14-pole, 3-phase motor of this example, having an 18 slot stator, the electrical angle of the second tooth is 20×14/2+60=200 degrees. These values are tabulated in FIG. 12, along with the sines of the tooth electrical angles determined in the subsequent operation 1406.

In the next step 1407, the number of turns for each tooth is determined by dividing the sine of the tooth electrical angle by the sum of the absolute values of the sines of all the tooth electrical angles, then multiplying by the total number of turns per phase. In FIG. 12, these turn values are expressed as a percentage of the total number of turns per phase.

In the last operation 1408, the winding direction is determined by examining the sign of the sine value for the tooth electrical angle. If the sign has a first value (positive, for example), the coil is wound in a first direction. The coil is wound in the opposite direction if the sign is negative.

Figure 15:
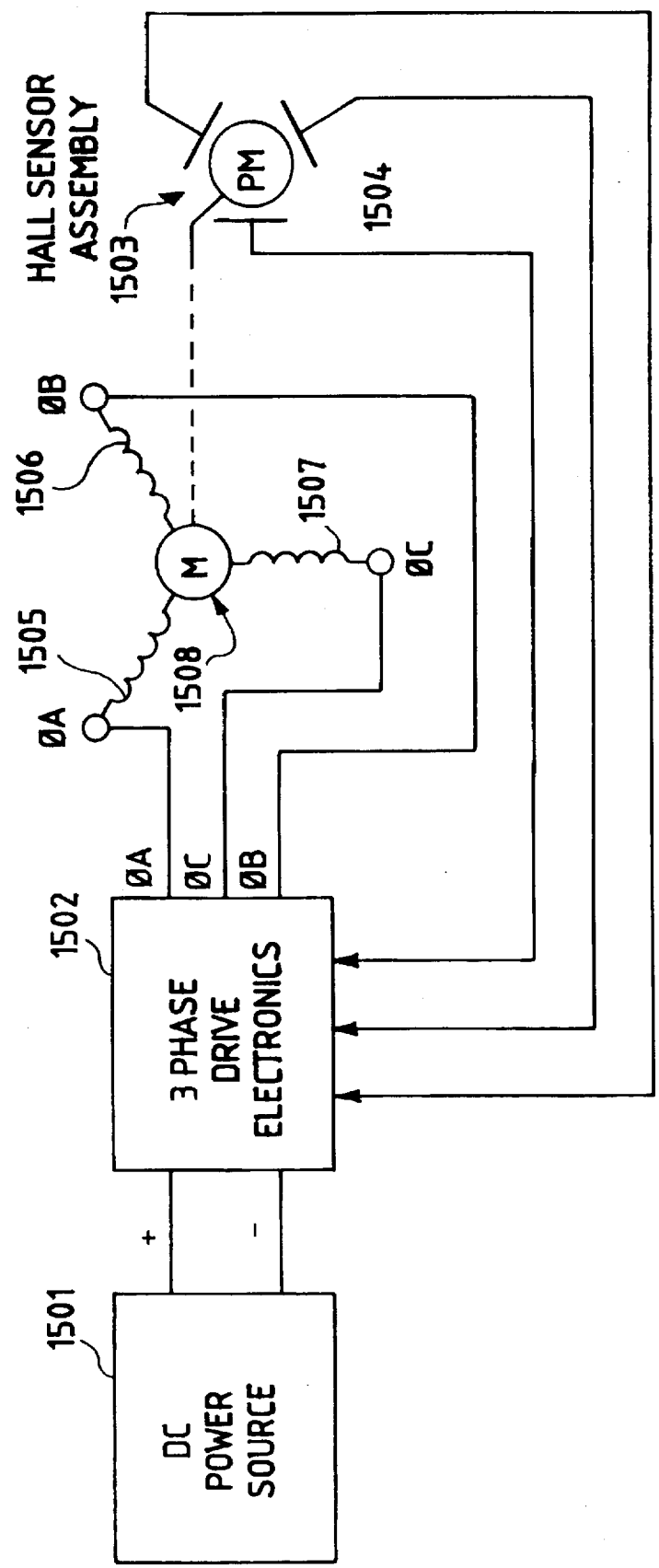
FIG. 15 is a representation of an electronically commutated motor in block diagram form.

FIG. 15 illustrates an ECM in block diagram form. A DC power source 1501 provides operating power to 3-phase drive electronics 1502 that produce the requisite phase winding excitations in a known manner. The 3-phase drive electronics 1502 include outputs coupled to Y-connected phase windings 1505–1507 in the stator 1508 that produce rotation of the permanent magnet rotor 1504 in the desired direction and at the desired speed. A Hall sensor assembly 1503 provides necessary rotor position information to the drive electronics 1502.

Figure 16:
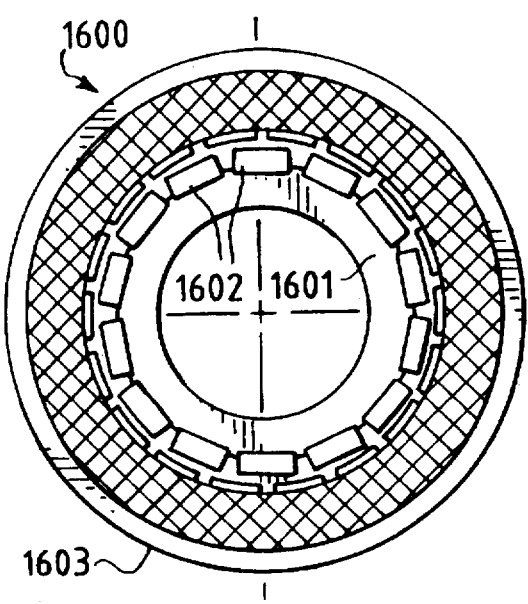
FIG. 16 is a top view of one embodiment of a permanent magnet motor in accordance with the present invention.
Figure 17:
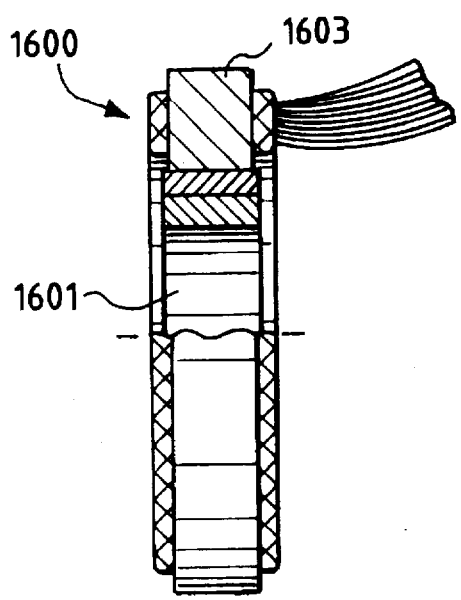
FIG. 17 is a side view of the permanent magnet motor of FIG. 16.

FIGS. 16 and 17 depict a multiple pole, multiple phase, permanent magnet motor in accordance with the present invention, in which a rotor assembly 1601 is rotatably mounted in the interior of a stator assembly 1603. The rotor assembly 1601 includes a plurality of permanent magnet poles 1602.

Figure 18:
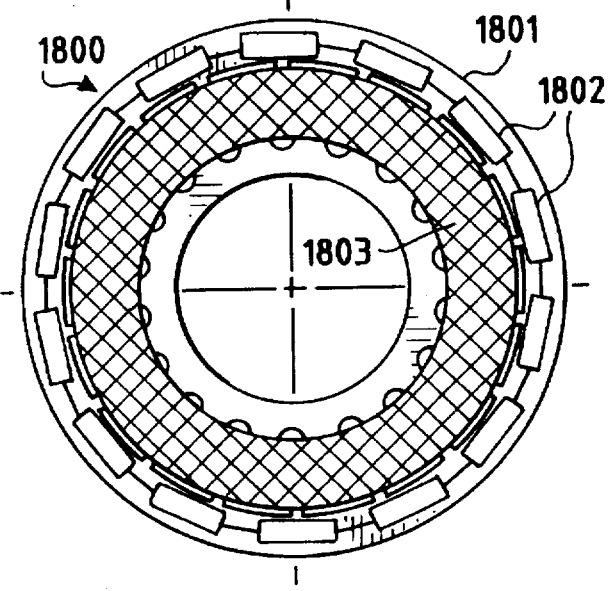
FIG. 18 is a top view of another embodiment of a permanent magnet motor in accordance with the present invention.
Figure 19:
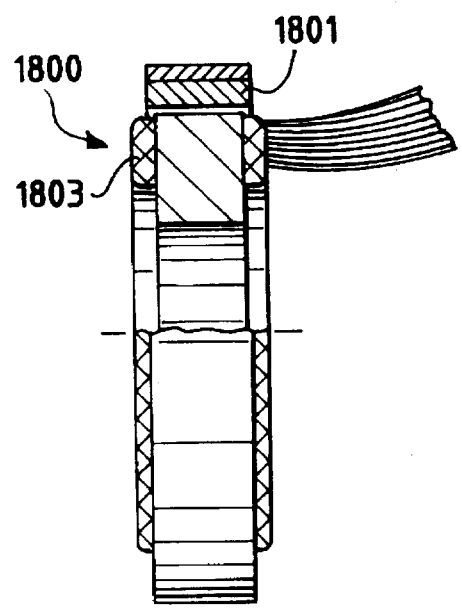
FIG. 19 is a side view of the permanent magnet motor of FIG. 18.

FIGS. 18 and 19 depict an alternative multiple pole, multiple phase permanent magnet motor in which the rotor assembly 1801 is rotatably mounted external to the stator assembly 1803. The rotor assembly 1801, with its permanent magnet poles 1802, is disposed such that the rotor assembly 1801 circumscribes the stator assembly 1803.

There have been described herein a multiple pole, multiple phase, permanent magnet motor and method for winding that are relatively free from the shortcomings of the prior art. It will be apparent to those skilled in the art that modifications may be made without departing from the spirit and scope of the invention. Accordingly, it is not intended that the invention be limited except as may be necessary in view of the appended claims.

What is claimed is:

1. A multiple pole, multiple phase, permanent magnet motor comprising:

a rotor having a plurality of permanent magnet poles;

a stator having a plurality of stator slots and an equal number of stator teeth defined by adjacent stator slots;

a plurality of phase windings disposed on the stator, each phase winding including a plurality of coils having a non-uniform number of turns, to develop electromagnetic poles in proximity to the stator, the electromagnetic poles for each phase being distributed symmetrically about the stator, equidistant from one another, and equal in number to the number of permanent magnet rotor poles;

the number of turns of each of the plurality of coils of each phase winding is selected in accordance with a predetermined sinusoidal relation, wherein the predetermined sinusoidal relation comprises:

$$n(t)=A \sin(\omega t - \theta);$$

where n=number of turns;

t=tooth number;

$\omega=(p/T)\pi$;

where p=number of poles;

T=total number of stator teeth;

$$\omega=\phi/2+\alpha;$$

where $\phi$=electrical angle between phases;

$\alpha$=mechanical angle between teeth; and

A=a constant of proportionality.

2. The permanent magnet motor of claim 1, wherein the constant of proportionality A is determined by dividing the total number of turns per phase by the sum of the absolute values of $$\sin(\omega t - \theta)$$

from t=1 to t=T.

3. The permanent magnet motor of claim 1, wherein winding direction is selected in accordance with the sign of n(t).

4. The permanent magnet motor of claim 1, wherein each of the coils of each phase winding surrounds no more than one stator tooth.

5. The permanent magnet motor of claim 1, wherein the number of stator slots is an integral multiple of the number of phases.

6. The permanent magnet motor of claim 1, wherein the number of stator slots is greater than the number of permanent magnet poles.

7. The permanent magnet motor of claim 1, wherein each phase winding is mechanically and electrically displaced from adjacent phase windings by an amount equal to 360 degrees divided by the number of phases.

8. The permanent magnet motor of claim 1, wherein the motor is an electronically commutated motor.

9. The permanent magnet motor of claim 8, wherein the motor includes position sensors coupled to a multiple phase drive network.

10. The permanent magnet motor of claim 9, wherein the position sensors are Hall effect sensors.

11. The permanent magnet motor of claim 8, wherein the phase windings are connected in a Y configuration.

12. The permanent magnet motor of claim 1, wherein the motor is a three-phase motor.

13. For a multiple pole, multiple phase, permanent magnet motor having a rotor including a plurality of permanent magnet poles, a stator including a plurality of stator slots and an equal number of stator teeth defined by adjacent stator slots, and a plurality of phase windings including a plurality of coils, a method for installing the phase windings onto the motor, the method comprising the steps of:

(a) selecting a first stator tooth;

(b) assigning a mechanical angle of 0 degrees to the first stator tooth;

(c) determining the mechanical angles of each subsequent tooth by adding an increment equal to 360 degrees divided by the number of stator teeth to the mechanical angle of the preceding tooth;

(d) assigning an electrical angle of one-half the electrical angle between phases to the first stator tooth;

(e) determining the electrical angles of each subsequent tooth by multiplying the mechanical angle of the tooth by one-half the number of permanent magnet poles and adding an offset equal to one-half the electrical angle between phases;

(f) determining the sine of each of the tooth electrical angles;

(g) determining the number of turns for each tooth by dividing the sine of the tooth electrical angle by the sum of the absolute values of the sines of all of the tooth electrical angles, then multiplying by the total number of turns per phase; and (h) installing the number of turns determined in step (g) to the corresponding tooth in a first direction if the sine of the electrical angle has a first sign, else in the opposite direction if the sine of the electrical angle has a second sign.

14. The method in accordance with claim 13, wherein, if the sine of the electrical angle for a given tooth is zero, winding no turns on that tooth, and proceeding to the next tooth.

15. The method in accordance with claim 13, wherein each of the coils of each phase winding surrounds no more than one stator tooth.

16. The method in accordance with claim 13, wherein the number of turns and the winding direction for the coils of each subsequent phase winding are determined by adding the electrical angle between phases to each electrical angle determined in steps (d) and (e), then repeating steps (f) through (h).

* * * * *

UNITED STATES PATENT AND TRADEMARK OFFICE
CERTIFICATE OF CORRECTION

PATENT NO. : 5,723,931
DATED : March 3, 1998
INVENTOR(S) : Boris D. Andrey

It is certified that error appears in the above-identified patent and that said Letters Patent is hereby corrected as shown below:

In the Claims:

Column 8, Line 21, delete "$\omega=\phi/2+\alpha$" and insert --$\theta=\phi/2+\alpha$--

Signed and Sealed this

Ninth Day of June, 1998

BRUCE LEHMAN

Attest:

Attesting Officer

Commissioner of Patents and Trademarks